June 28, 1955  C. C. FOSTER  2,711,659
APPARATUS FOR FABRICATION OF FORGED BRAKE BAND AND THE LIKE
Original Filed Jan. 30, 1952  2 Sheets-Sheet 1
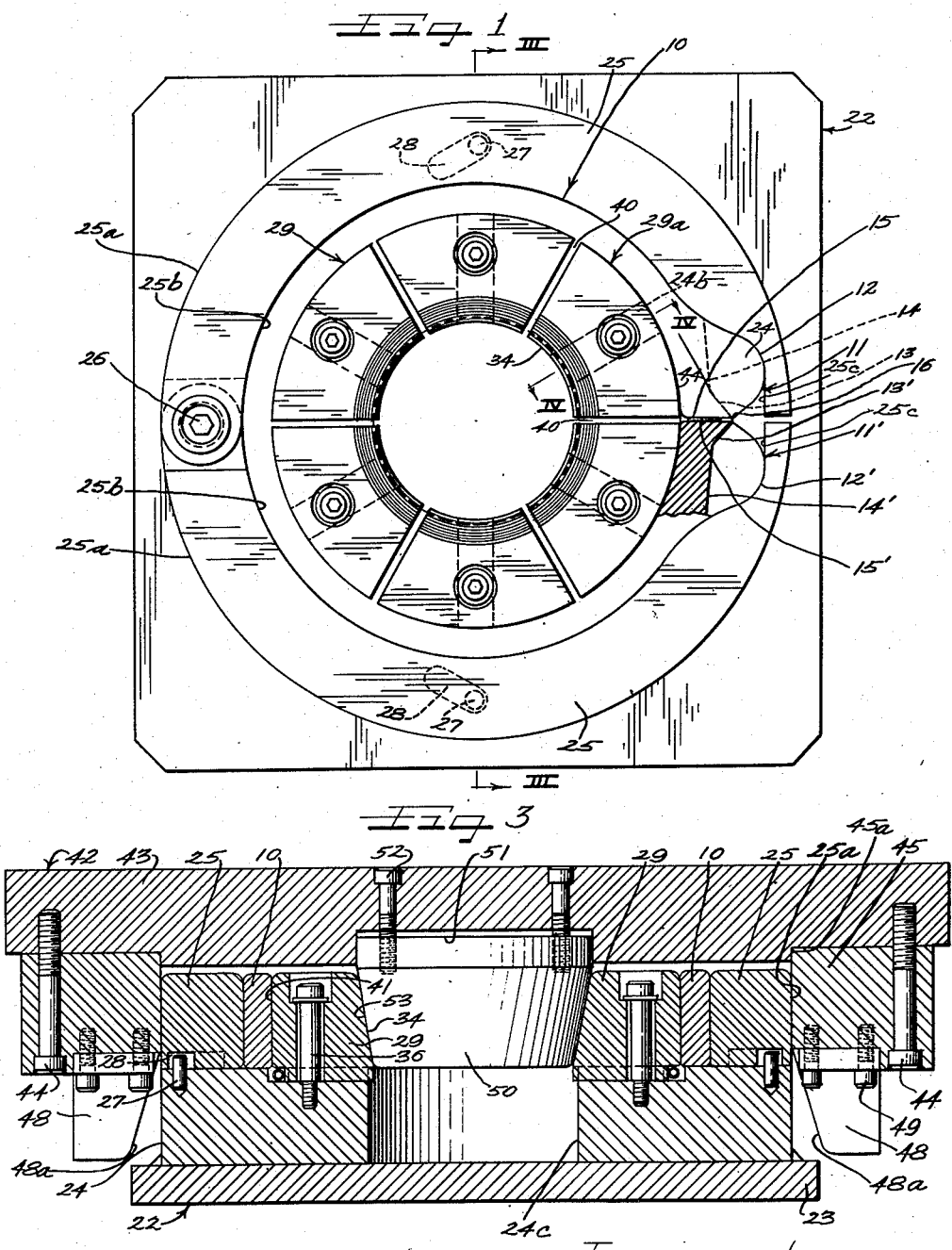
Inventor
Charles Clifford Foster

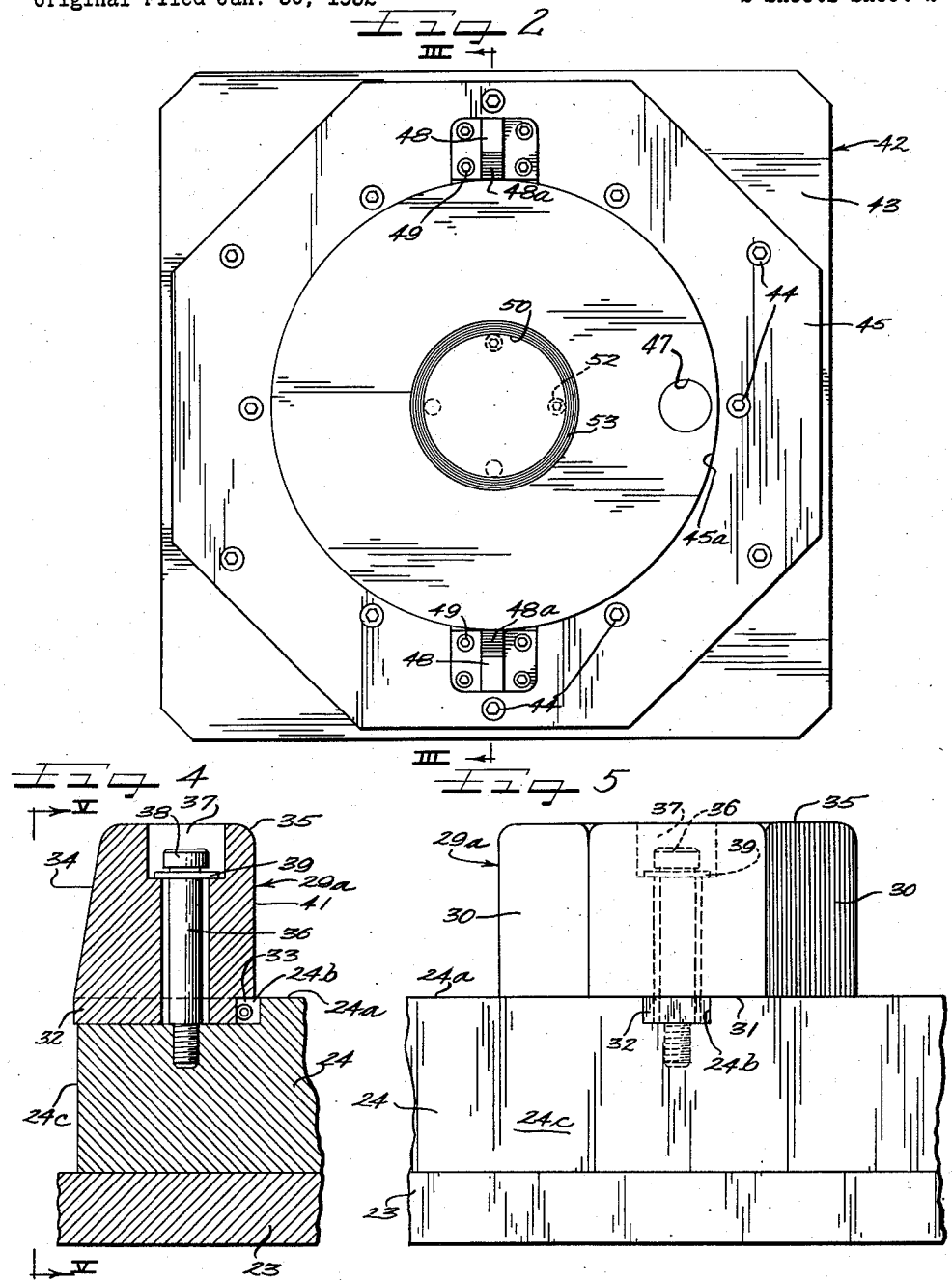

United States Patent Office 2,711,659
Patented June 28, 1955

2,711,659

APPARATUS FOR FABRICATION OF FORGED BRAKE BAND AND THE LIKE

Charles Clifford Foster, Berwyn, Ill., assignor to Kropp Forge Company, Chicago, Ill., a corporation of Illinois Original application January 30, 1952, Serial No. 269,060. Divided and this application January 12, 1954, Serial No. 403,606

3 Claims. (Cl. 78—60)

This invention relates to an improvement in the fabrication of articles of forgeable material having the ultimate shape of a split annulus having enlarged end portions, and more particularly, to an improved apparatus for fabricating forged steel brake bands and the like.

This invention is particularly concerned with an improved apparatus for fabricating heavy durable external brake bands for use on brake drums of heavy machinery such as tanks and caterpillar tractors. The use of ropes, flexible fabric or metal straps externally lapped about a rotatable cylindrical axle to control the rotary motion of the axle is, of course, well known. The use of essentially rigid arcuate brake shoes for frictional braking engagement with a portion of the periphery of a brake drum or wheel is, likewise, well known. Recently, however, there has developed a very great need for heavy durable external brake bands of substantial thickness and overall size, which are used, for example, in cooperation with brake drums for steering tanks.

Such external brake bands require a substantial braking surface, and, accordingly, are adapted to frictionally engage substantially the entire brake drum periphery, as contrasted to the usual brake shoe which is adapted to contact only a relatively small portion of the drum periphery. Also, such brake bands may not be actuated, as brake shoes, by direct application thereagainst of a radially aligned force. Instead, these bands have a split annulus or ring structure and are actuated by comparatively great, opposed tangential forces applied by members which engage the ring at opposite sides of the split therein. The application of such tangential forces results in the application of radial forces at substantially all of the points of contact (disregarding the presence of brake lining) between the brake band and the brake drum periphery. In addition, these brake bands must be particularly sturdy and durable, since they may be employed to control the speed of rotation of the brake drum as well as to prevent completely rotation of the drum by clamping engagement thereof.

Moreover, these external brake bands must have substantial size or body thereto in order to hold up under the strains created by the application of forces of very great magnitude during the braking operation. The dissipation of friction-created heat also requires a substantial amount of body for such brake bands.

It will, of course, be appreciated that such heavy external brake bands, generally made of a metal such as steel, cannot possibly be fabricated by means of a commercially feasible die drawing operation, for example. In general, it has been the practice heretofore to cut such brake bands by the use of suitable machine tools from a stock piece of suitable size. Such cutting of an annular band, for example, from a suitable stock piece must necessarily result in different grain structural alignment in the metal at different points in the annulus.

Another problem confronting the machine operation just described is that presented by the general shape of the fastening means or bosses that must be positioned adjacent the split in the annular band to afford means for applying brake actuating forces. Such bosses are preferably contoured according to various curves which are not concentric with each other or with the annular band and which, being thus offset or out of line, complicate additionally the machining thereof. The various practices of welding, bolting, riveting or otherwise fastening separately made bosses to the annular brake bands, likewise, are unduly complicated and also necessarily involve additional fabricating steps and the possibility of further disturbance of the physical properties of the body of the bands, particularly in the region of such fastened bosses.

It can thus be seen that in each case the apparatus employed heretofore for the fabrication of such brake bands left much to be desired along the lines of simplification of operation as well as control of the ultimate physical properties in the final product.

The instant invention, however, provides a significant advance in this art in that it provides an improved apparatus for fabricating such a brake band by certain forging operations so as to obtain an improved product that is an annular brake band having a circumferentially aligned grain structure and mounting integral upset drop forged fastening bosses.

It is, therefore, an important object of the instant invention to provide an improved apparatus for fabricating such brake bands or the like articles of manufacture.

It is another object of the instant invention to provide an improved apparatus for fabricating brake bands and the like, that is a sizing die assembly comprising inner and outer concentric annular die units adapted to press forge a work piece therebetween, said inner die unit comprising a plurality of radially movable peripherally spaced generally pie shape sections presenting arcuate peripheral forging faces and said outside die members comprising a pair of hemi-annular members inwardly, when said recessed die is pressingly urged into cooperating position with said annular die units.

Other objects, features and advantages of the present invention will become apparent to one skilled in the art from the following description of the embodiment illustrated in the accompanying drawings in which:

On the drawings:

Figure 1 is a top plan view of the bottom die of the sizing die assembly of the invention, normally presenting upwardly extending concentric annular die units adapted to forge a work piece therebetween;

Figure 2 is a bottom plan view of the top die of the sizing die assembly of the invention normally presenting downwardly extending die portions for cooperating with the die of Figure 1;

Figure 3 is a sectional elevational view showing the dies of Figures 1 and 2 in cooperating position, the sectional view of the die of Figure 1 being taken substantially along the line III—III thereof and the sectional view of the die member of Figure 2 being taken substantially along the line III—III thereof;

Figure 4 is an enlarged sectional elevational fragmentary detail view of a movable pie section of the bottom die shown in Figure 1 taken substantially along the line IV—IV thereof; and Figure 5 is an enlarged elevational fragmentary detail view taken from the line V—V of Figure 4.

As shown on the drawings:

In Figures 1 and 3, the reference numeral 10 indicates generally a welded annular stock piece of suitably forgeable material, such as a hot rolled mill bar steel stock piece formed by a series of operations which are described in detail in my copending application Serial Number 269,060 filed January 30, 1952, from which this is a division.

The initial metal stock piece may be a bar having for example, a thickness "a" of about one inch, a length "b" of about 54 inches and a width "c" of about 3½ inches. The bar is subjected to an upset forging operation at both ends to increase the thickness thereof at "d" to about 2½ inches (and a reduction in length of about 6 to 5) and this is followed by a drop forging operation.

In the instant drop forging operation, the finished drop forged boss, designated generally by the reference numeral 11 (in the case of the boss shown in full view in Figure 1), comprises a pair of upstanding generally hemi-cylindrical spaced ears 12, 12. The ears 12, 12 extend upwardly along each side of the boss portion 11 and have therebetween a recess extending inwardly along the generally horizontal floor portion 13, aligned longitudinally of the forging 10, and then angularly upwardly along a second inwardly extending floor portion 14. The lower extremity of the drop forged boss 11 has a generally beveled face 15, which, as will be pointed out in greater detail later herein defines a plane which in the ultimately formed annular member 10 extends radially with respect thereto. The boss portion 11 at the opposite end is formed in the same shape, the corresponding portions being indicated by primed reference numerals. It will, of course, be appreciated that the particular overall dimension of the length which it is desired to control is the distance "f" between the bottom inward edges of the beveled faces 15, 15' (here indicated as the inside circumference). Since it is intended that the opposite beveled faces 15, 15' will be aligned contiguously in a substantially radially extending plane in the ultimately formed annulus 10, the distance "f" will therefore determine the inner circumference of such annulus 10. In the example here shown the distance "f" should be about 45+/−⅛ inches.

The next step in the instant process involves the formation of the split annulus. In general, bending operations are well known in the metal treating art, although several different procedures are employed. In the instant process the preferred procedure involves heating the entire drop forging and then bending the same by means of a hydraulic bending fixture or "bulldozer" (not shown) which tends to roll the heated forging around a collapsible mandrel (not shown), thereby making a plurality of successive U-shaped turns therein until a substantially annular piece such as the annulus 10, herein shown, is obtained. In the instant example, the annulus inside diameter "g" is about 14 inches. In the instant bending operation only an approximately annular shape in the piece 10 is necessary since subsequent sizing operations, to be described hereinafter, are capable of taking care of finer corrections.

In particular, it is important to note the resulting arrangement of the allochirally mated upset-drop forged bosses 11' and 11 in the resulting annulus 10. As can be seen, the beveled faces 15, 15' are now positioned contiguously. The ears 12, 12' in each of the boss portions 11' and 11 are now longitudinally spaced with respect to the annulus 10 and extend radially outwardly therefrom. The floors 14, 14' of the recesses between the ears 12, 12' are now more or less aligned in a plane generally tangential to the annulus 10.

The next step in the instant operation involves the fastening of the boss portions 11' and 11 together by a suitable means which will prevent their separation during the subsequent sizing operation, which, as will be pointed out hereinafter, is intended to effect the necessary deformation of the body portion of the annulus 10 in order to coin the same into a desired final contour, particularly with respect to the outside dimensions thereof.

Although other fastening means may be used, it has been found particularly advantageous in the practice of the instant invention to weld the contiguous faces 15, 15' together. Preferably such faces are arc welded along all four edges, that is, the longitudinally extending top and bottom edges and the radially extending front and back edges. Again, arc welding in general is a well known art and need not be described herein in further detail. The resulting welds, herein designated generally by the reference numeral 16, furnish a suitably strong fastening means for the subsequent steps in the instant invention.

In general, the sizing operation involves the use of a unique die arrangement whereby the welded annulus 10 is subjected to an extending and/or contracting forging operation to size the same in predetermined manner. The operation involves subjecting the heated welded annulus 10 to forgeable forces between die members adapted to define a predetermined outside diameter therefor and radially movable die members adapted to exert outwardly directed force along a substantial inside peripheral area of the annulus 10.

The precise character of the sizing operation may best be appreciated from a consideration of the operation of the press die assembly of the invention.

Referring to Figure 1, wherein the reference numeral 22 designates generally a bottom die of the assembly, it will be seen that the bottom die 22 has a supporting normally horizontally positioned flat rectangularly shaped table 23. Centrally positioned on the top of the table 23 and suitably fixed thereto (by means such as the weld shown) is a generally annular base 24. A pair of allochirally matable hemi-annular arms 25, 25 are pivotally mounted at one end of each on the base 24, by means of a suitable bolt assembly 26 passing through suitable apertures in the arms 25 and threadedly engaged in the base 24, in a manner well understood by skilled workers.

The bolt assembly 26 permits free pivotal movement of the arms 25, 25 about a pivot point defined by the bolt; but the extent of the pivotal movement of each arm is limited by a pin 27 fitted in a recess in the top surface of the annular base 24 about 90° from the bolt 26 and extending upwardly into an elongated slot-like recess 28 in the arm 25, which recess 28 cooperates with the pin 27 to limit the pivotal or swinging movement of the arm 25, as will be readily understood.

The outside peripheral walls 25a of the arms 25 are adapted to be aligned with the outside peripheral walls of the base 24, although the arms 25 may be moved in and out of such alignment by their pivotal movement. The inside peripheral walls 25b of the arms 25, as can be seen in Figure 1, are adapted to be positioned so as to have substantially the shape and contour of the outside peripheral walls of the welded annulus 10. The extremities 25c of each of the arms 25 opposite the pivot-bolt 26 have their inside peripheral surfaces contoured to the general outside peripheral shape of the corresponding bosses 11' and 13'.

Spaced inwardly from the arms 25 is a die unit, designated generally by the reference numeral 29, which is annularly shaped and positioned concentrically of the base 24 and the arms 25; rising upwardly above the inner periphery of the base 24, to approximately the same height as the arms 25, which height is substantially the longitudinal dimension (i. e., the width "c") of the welded annulus 10. As can be seen from Figure 1, the annular die unit 29 comprises six generally pie-shaped substantially identical sections one of which is designated by the reference numeral 29a and is shown in detail in Figures 4 and 5.

Referring to Figures 4 and 5, it can be seen that the pie-section 29a has the shape of approximately one-sixth of the annular unit 29, cut along radially extending surfaces 30, 30. The major portion of the bottom face 31 of the pie-section 29a is slidably mounted upon the flat top face 24a of the base 24, but a central generally elongated rectangular depending radially aligned boss 32 integral with the pie-section 29a is slidably engaged by a radially aligned groove or recess 24b so as to permit radial movement of the pie-section 29a. The groove 24b extends from the inner peripheral wall 24c of the base 24 radially outwardly substantially the radial thickness of the pie-section 29a and, at the outer extremity thereof, there is mounted a spring member 33 for resiliently urging the pie-section 29a (via the boss 32) inwardly so that the boss 32 normally extends inwardly of the inner base wall 24c a short distance (Figure A). The inner peripheral wall 34 of the pie-section 29a, however, is tapered outwardly from the boss 32 so that it merges curvingly with the top wall 35 of the pie-section 29a along a line outside of the vertical projection of the inner peripheral base wall 24c.

Vertical movement of the pie-section 29, is prevented by means of a bolt 36 threadedly engaged with the base 24 in a recess in the central region of the floor of the radial groove 24b. The bolt 36 is positioned in an aperture 37 in the pie-section 29a. As can be seen the aperture 37 has an enlarged opening or mouth in the top wall 35 extending downwardly a short distance to receive completely the bolt head 38 and washer 39; the remainder of the aperture 37 is somewhat narrower cooperating with the mouth portions to define a shoulder to retain and slidably engage the washer 39 and to permit limited free radial movement of the pie-section 29a relative to the bolt 36. The narrowed aperture 37 permits radial movement of the pie-section 29a, for example, in the neighborhood of ¼ to ⅜ an inch in a die of the size suitable for use in sizing the welded annulus 10 of the instant example.

It will be appreciated that each of the other pie-sections of the unit 29 has substantially an identical structural arrangement and each is peripherally spaced from the others (as at 40 in Figure 1) so as to permit radial movement of each. It will thus be seen that the vertically rising outer peripheral face or wall 41 of each pie-section 29 may be urged outwardly toward the inner peripheral face 25b of the arms 25, in response to outward radially directed force against the inner peripheral pie-section face 34; and the inner peripheral face 25b of the arms 25 may be urged in the opposite radial direction by inward radially directed force against the outside arm walls 25a. The press die unit, indicated generally by the reference numeral 42, is adapted to supply both such forces simultaneously.

Referring to Figures 2 and 3, it will be seen that the press unit 42, which is the top die of the assembly, has a supporting normally horizontally positioned flat rectangularly shaped table 43. Centrally positioned on the bottom of the table 43 and suitably fixed thereto by bolts, as at 44, is a generally annular frame 45 extending downwardly approximately the longitudinal dimension "c" of the welded annulus 10. As can be seen in Figure 2, the inner peripheral wall 45a of the frame 45 is cylindrical in shape; preferably the inner frame 45a and the outer arm walls 25a are of identical contour, such as each being truly cylindrical so that extensive surface contact therebetween may be made (as in the assembled position shown in Figure 3) for the uniform application of forces therebetween.

As will be appreciated, when the arm walls 25a and the frame walls 45a are in snug forced contact the exact position of the inner arm walls 25b is fixed. This exact position of the inner arm walls defines the exact outside shape and contour of the welded annulus 10; and the design of the arms 25 and the cooperating frame 45 may thus be employed for the purpose of accurately defining the outside dimensions of the welded annulus 10. The arms 25 thus are capable of forgingly urging the welded annulus 10 inwardly, or contracting the same, as well as backing the welded annulus 10 up so that expansion thereof may not take place past the desired predetermined outside dimensions.

Certain other features of the press die unit 42 are adapted to perfect the cooperation between the frame 45 and the arms 25. For one thing, a dish-shaped recess 47 in the press table 43 is positioned to receive the elevated portions of the bolt assembly 26 when the units 22 and 42 are in cooperating positions. Also, cam-like guides 48, 48 are mounted in cooperating recesses on opposite sides of the frame 45 by bolts 49. The guides 48 extend downwardly from the frame 45 and present inwardly tapering inner faces 48a, 48a for cam-cooperation with the outer arm walls 25a to suitably align the same for cooperation with the inner frame walls 45a.

During the press-cooperation between the units 22 and 42, the inwardly directed forging forces obtained by frame 45-and-arms 25 cooperation are accompanied by simultaneous opposing outwardly directed forging forces obtained by cooperations between the pie-sections 29 and the tapered boss 50.

The tapered, downwardly-apexed frusto-conical boss 50 is suitably mounted in a central cylindrical recess 51 in the table 43, affixed thereto by bolts 52 and extending downwardly therefrom. The tapered walls 53 of the boss 50 have substantially the taper of the inner pie-section walls 34; for cooperation therewith over an extensive force transmitting surface area. As can be seen from Figure 3, downward urging of the top unit 42, as by means of a forging press (not shown) wherein the top unit 42 is moved against the bottom unit 22 in fixed position, causes cam action between the taper boss 50 and the pie-sections 29 resulting in radial outward urging of the pie-sections 29.

The outer peripheral pie-section faces 41 are, of course, substantially vertical so as to define cooperatively almost the entire inner peripheral walls of a true cylinder, allowance being made for the spaces 40. The faces 41 thus forgingly urge the welded annulus 10 radially outwardly, against the inner arm walls 25b, which as has been explained ultimately arrive at a fixed immovable position so as to define the final outside dimension of the welded annulus 10.

In carrying out the sizing operation, the annulus 10 has first been bent to a sufficiently truly annular shape to fit in the maximum space afforded between the arms 25 and the pie-sections 29, in distended positions. The annulus 10 is, of course, welded to prevent opening and closing at the split portion and then heated to forging temperatures in preparation for the sizing. The heated welded annulus is then placed in between the arms 25 and the pie-sections 29 and the units 22 and 42 are brought into cooperating position (Figure 3) under pressure suitable to accomplish the forge-sizing operation.

The sizing completes the forging operations and the sized welded annulus 10, thereby obtained, has the precise outside dimensions ultimately desired; and it therefore, need only certain finishing touches for the final preparation of the brake band.

The sized welded annulus 10 is itself a finished product, in that the forging and the like "heavy-machinery" operations are completed. The product thus obtained may be shipped from the forging shop to the final user for example, or the tank or tractor assembly shop, wherein there may be done machining of the inner periphery of the annulus 10 to the precise dimension desired to fit exactly upon new or perhaps used and worn brake drums. After the machining of the inner periphery is done, a split between the bosses 11 and 11' may be cut to complete the brake band. Plating and the like treatments of the inner periphery of the band may be carried out to improve the operational characteristics of this surface. In many such subsequent operations, and in particular in the machining of the inner periphery of the band, it is advantageous to have the weld 16 holding the ends of the annulus 10 together to facilitate handling thereof.

The instant invention provides a very important advantage over the prior operations in that it permits maximum exploitation of the metallic grain structure.

As is well known, the purpose of subjecting metal to mechanical working is not merely that of bringing it into a desired shape. Mechanical work affects the structure and properties of most metals and alloys in a markedly favorable manner. During normal solidification of a metal from fusion the formation of a crystalline structure takes place. Such crystalline structure is usually quite coarse. Although, whatever the treatment to which metal may be subjected, it remains essentially crystalline, the size or scale of that crystal structure is highly important as affecting physical behavior. Also, mechanical working breaks down the original "cast" structure and replaces it by much finer and more satisfactory structure.

In addition, mechanical working particularly in the case of steel, serves to close up and perhaps to bring about welding of cavities existing in the cast metal. It also brings about a redistribution of the non-metallic impurities. These become elongated in the direction in which the metal is caused to flow under mechanical treatment and tend to confer upon the material something which has the appearance of grain or fiber. Although there is no true fiber in any metal, this so called "grain" structure is a recognized physical characteristic of metal.

As can be appreciated the grain structure in the initial bar stock piece is essentially a longitudinal parallelly aligned grain structure obtained by rolling the bar stock piece into ultimate shape.

The upsetting operation does not disturb the longitudinal grain structure of the main body of the resulting upset forging and, in addition, the upsetting at the ends of the forging has the effect of improving the physical properties thereof, particularly for the purpose of mounting fastening means to resist longitudinal pull.

It will, likewise, be appreciated that the bending and subsequent sizing operations do not appreciably affect the generally longitudinal alignment of the grain structure initially present in the rolled bar stock piece. The net result is a circumferentially aligned parallel grain structure through the main body of the annulus 10 and extremely tough tangential force resisting fastening bosses 11' and 11.

It will, of course, be understood that various details of construction may be varied to a wide range while not departing from the principles of this invention, and it, therefore, is not the purpose to limit the patent granted hereon otherwise necessitated by the scope of the appended claims.

I claim:

1. A die assembly, comprising inner and outer concentric annular die units adapted to forge a workpiece therebetween, said inner die unit comprising a plurality of radially movable peripherally spaced generally pie-shaped sections presenting arcuate peripheral forging faces and said outer die unit comprising a pair of hemi-annular sections pivotally mounted at one end presenting inner forging faces opposing the peripheral section forging faces; and a cooperating press die unit annularly recessed to receive said annular die units and having a central tapered boss adapted to urge said pie-shaped sections outwardly and a concentric annular flange portion adapted to urge said hemi-annular sections inwardly, when said recessed die unit is urged into cooperating position with said annular die units.

2. A die assembly, comprising inner and outer concentric annular die units adapted to forge a workpiece therebetween, said inner die unit comprising a plurality of radially movable peripherally spaced generally pie-shaped sections presenting arcuate peripheral forging faces and said outer die unit comprising a pair of hemi-annular sections pivotally mounted at one end presenting inner forging faces opposing the peripheral section forging faces.

3. A die assembly, comprising inner and outer concentric annular die units adapted to forge a workpiece therebetween, said inner die unit comprising a plurality of radially movable peripherally spaced generally pie-shaped sections presenting arcuate peripheral forging faces and said outer die unit comprising a pair of hemi-annular sections pivotally mounted at one end presenting inner forging faces opposing the peripheral section forging faces; and a cooperating press die presenting cam surfaces for simultaneously urging the inner units outward and the outer units inward.

References Cited in the file of this patent

UNITED STATES PATENTS

| | | |
|---|---|---|
| 1,224,805 | Stevenson | May 1, 1917 |
| 1,445,150 | Manning | Feb. 13, 1923 |
| 1,475,032 | Shrum et al. | Nov. 20, 1923 |
| 1,502,722 | Hill | July 29, 1924 |
| 1,625,131 | Miller | Apr. 19, 1927 |